United States Patent [19]

Harvey

[11] Patent Number: 5,017,954
[45] Date of Patent: May 21, 1991

[54] CAMERA SHUTTER WITH THERMAL ACTUATOR

[75] Inventor: Donald M. Harvey, Webster, N.Y.

[73] Assignee: Eastman Kodak Company, Rochester, N.Y.

[21] Appl. No.: 478,904

[22] Filed: Feb. 12, 1990

[51] Int. Cl.$^5$ ................................................ G03B 9/08
[52] U.S. Cl. ................................ 354/234.1; 354/457; 354/250
[58] Field of Search ..................... 354/457, 234.1, 250, 354/258.1, 256, 254

[56] References Cited

U.S. PATENT DOCUMENTS

| | | | |
|---|---|---|---|
| 3,110,824 | 11/1963 | Flanagan | 310/8.5 |
| 3,883,885 | 5/1975 | Orlando | 354/258 |
| 4,190,336 | 1/1980 | Frank et al. | 354/457 |
| 4,664,493 | 5/1987 | Takagi | 354/249 |

*Primary Examiner*—A. A. Mathews
*Assistant Examiner*—Howard B. Blankenship
*Attorney, Agent, or Firm*—Roger A. Fields

[57] ABSTRACT

An electrically operated shutter for photographic apparatus, particularly cameras, wherein a movable element for blocking and unblocking the light path to the film is operated by the bending and unbending of a bimetallic element upon heating by electric current and subsequent cooling, preferably with the use of heat sink means moveable into heat transferring relation with the bimetallic element to hasten cooling.

14 Claims, 1 Drawing Sheet

CAMERA SHUTTER WITH THERMAL ACTUATOR

FIELD OF THE INVENTION

The invention relates to electrically actuated shutters for photographic apparatus, such as camera and printers, particularly the former, using bimetallic element means to operate a shutter element. If needed to speed operation of the shutter, a heat sink is moved into heat transferring relation with the bimetallic element means to accelerate cooling of the bimetallic element.

DESCRIPTION OF THE PRIOR ART

Electrically operated shutters of various types are known, but I am not aware of any prior publication of a shutter release using a bendable bimetallic element, nor using such element with a heat sink to accelerate cooling and thereby shorten the interval between cycles.

I am aware of the following prior patents in the field of electrically operated shutters: U.S. Pat. No. 3,110,824, issued Nov. 12, 1963, disclosing the use of a bendable piezoelectric element; U.S. Pat. No. 3,883,885, issued May 13, 1975, disclosing the change in length of a wire by heating to operate a shutter element; and U.S. Pat. No. 4,664,493, issued May 12, 1987, disclosing the application of electric current to a spring to operate a shutter element by changing the resiliency of the spring.

Obviously, none of these prior patents disclose or suggest the present invention.

SUMMARY OF THE INVENTION

The present invention is concerned with photographic apparatus shutters, particularly in cameras, wherein a bendable bimetallic element operates a moveable part, such as a shutter blade, to block and unblock the light path to photographic film. The bimetallic element is elongated and an electric circuit is provided to heat the element after the camera user operates the shutter actuator to make an exposure. After the exposure is made the heating circuit is deactivated. In a preferred embodiment, the bimetallic element operates the closing blade of a two-blade type shutter and causes the closing blade to move to a light blocking position. In order to accelerate cooling of the bimetallic element so as to ready the camera more quickly for the next exposure, a heat sink is moved into heat transferring relation to the bimetallic element. When cooled, the bimetallic element moves the blade back to the unblocking position.

BRIEF DESCRIPTION OF THE DRAWINGS

The invention will be described in connection with the appended drawings, in which:

FIG. 1 is a diagrammatic drawing of a shutter mechanism according to the invention;

FIG. 2 is a view from above, looking down on the "U" shaped bimetallic element and its connection to a shutter blade;

FIG. 3 is a view similar to FIG. 1, but showing the parts in their respective positions upon operation of the shutter actuator, with the exposure opening unblocked; and FIG. 4 is a view similar to FIGS. 1 and 3, but showing the heater circuit, the bimetallic element being bent and having moved the closing blade to the blocking position.

DETAILED DESCRIPTION OF THE PREFERRED EMBODIMENT

Figures 1, 2, 3, 4:
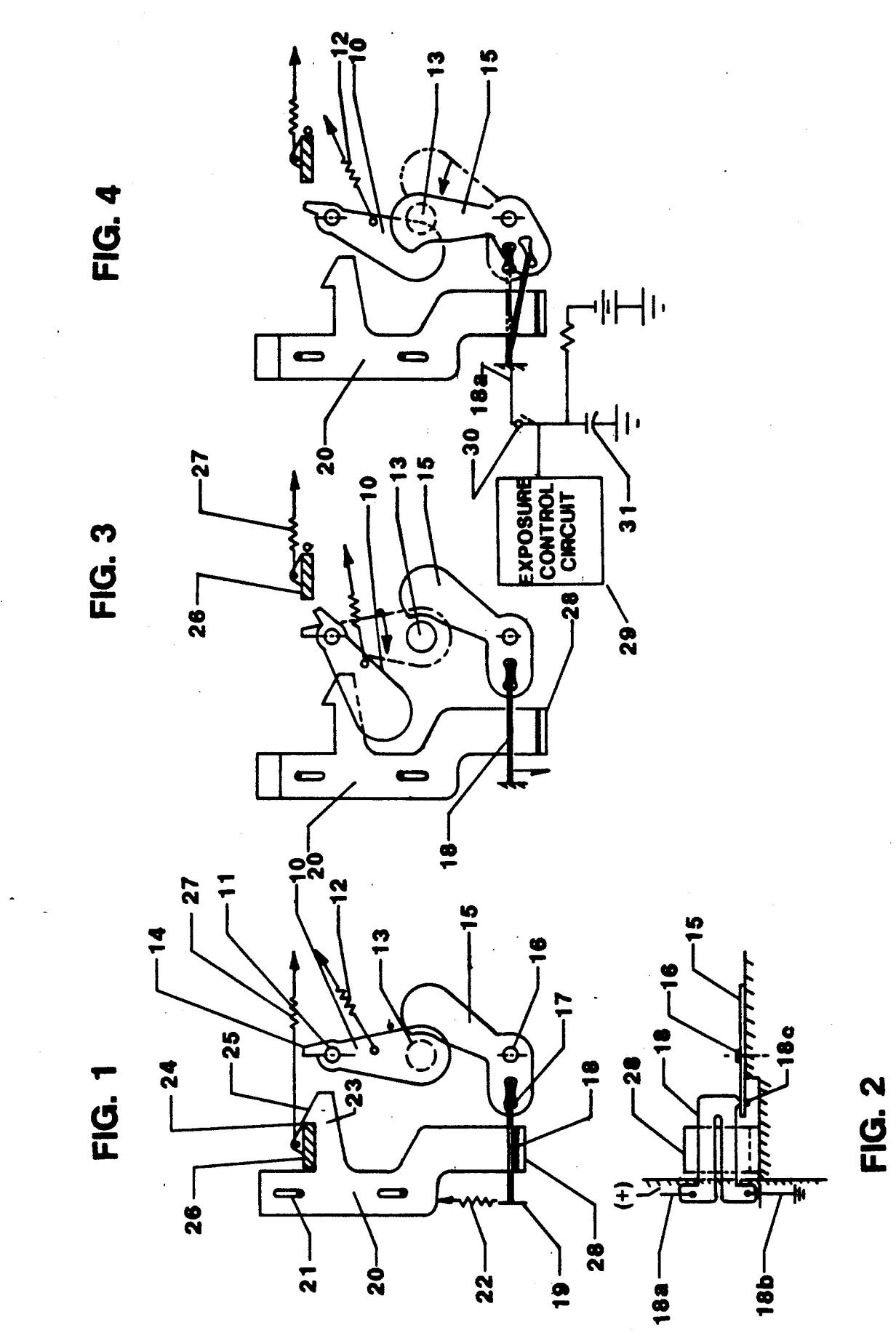

Referring to FIG. 1, there is shown a camera shutter of the type having an opening blade 10 mounted on a pivot 11 and biased to a light path blocking position by a spring 12. The light path is through the exposure aperture indicated at 13. Blade 10 has an upwardly extending tip 14. The closing blade is shown at 15, moveable about a pivot 16 and having an hour glass shaped aperture 17 to receive a tab 18c on one end of a bimetallic element 18, the other end of which is fixed at 19.

As shown in FIG. 2, bimetallic element 18 is "U" shaped, with the closed end of the "U" carrying tab 18c which extends into the hour glass shaped opening 17 in blade 15. The two open ends of the "U" are fixed, one open end being grounded at 18b, the other open end being connectable to the heating circuit through switch 30.

A shutter actuator 20 is mounted for up and down movement by pin and slot means 21. The actuator is operated by the user to initiate an exposure cycle, that is, to take a picture. The shutter actuator is biased upwardly by spring 22, and has an arm 23 extending to the right, the arm having a detent surface 24 and an exterior cam surface 25. A high energy member 26 is normally retained in the position shown in FIG. 1 by its engagement with detent surface 24, member 26 being strongly biased to the right by spring 27.

Attached to the lower end of shutter actuator 20 is a heat sink 28 made of a material of high thermal conductivity such as aluminum or brass, the heat sink being in contact with the lower surface of bimetallic element 18 before the beginning of an exposure cycle (FIG. 1).

In FIG. 4 I have indicated an exposure control circuit 29 which is actuated (by means not shown) by opening movement of opening blade 10. Circuit 29 controls switch means 30 which controls heating of bimetallic element 18. Closing of switch 30 permits a capacitor 31 to discharge through bimetallic element 18 via connector 18a and ground connection 18b. This causes immediate heating of element 18 and the resulting bending thereof. Opening of switch causes capacitor 30 to recharge for the next exposure.

It will be noted that in the positions of the parts shown in FIG. 1, heat sink 28 is in contact with bimetallic element 18. It will also be seen from the drawings that as the heat sink moves upwardly from the position shown in FIGS. 3 and 4 into contact with the underside of bimetallic element 18, the heat sink not only accelerates cooling of the element, but also urges the bimetallic element upwardly toward the position shown in FIG. 1.

In a preferred embodiment, the bimetallic element is a Texas Instruments product known as "Tenflex Type P 675 R". Using a 0.250 inch exposure aperture, the bimetallic element is about 0.005 inch thick and about 0.250 square inch in area, and is "U" shaped as shown in FIG. 2. The provision for rapid cooling and urging of the bimetallic element back to the FIG. 1 position shortens the time required for the element to return to the starting position so that the next exposure can be made.

OPERATION

Starting with the parts in the FIG. 1 position, an exposure cycle is initiated when the user depresses actuator 20 against the resistance of spring 22. This moves heat sink 28 downwardly away from bimetallic element 18 and moves arm 23 downwardly, releasing high energy element 26 for movement to the right under the strong bias of spring 27. In so moving, element 26 strikes the projection 14 on opening blade 10 and rotates that blade in a clockwise direction so that it moves from a blocking to an unblocking position with respect to the exposure aperture 13, this movement of opening blade 10 initiating integration in exposure control circuit by means not shown. Closing blade 15 is in its normal, unblocking position, hence an exposure is made, as shown by the position of the parts in FIG. 3 immediately after depression of the exposure actuator 20, and before spring 12 has had time to restore blade 10 to its blocking position.

Depression of shutter actuator 20 has caused circuit 29 to discharge capacitor 31 through the bimetallic element 18 which immediately bends to the position shown in FIG. 4, swinging closing blade 15 counterclockwise to a blocking position over exposure aperture 13. This terminates the exposure. Meanwhile blade 10 has begun swinging back to its blocking position.

In FIG. 4, exposure actuator 20 has not yet been released by the user. Current passage through the bimetallic element is terminated by exhaustion of capacitor 31 (less than 1 millisecond). When exposure actuator 20 is released, spring 22 moves the actuator upwardly, thereby moving heat sink 28 into contact. This movement of the actuator moves heat sink 28 upwardly into contact with the underside of bimetallic element 18, thus draining heat from the element 18 and at the same time urging element 18 toward its FIG. 1 position. High energy member 26 is moved back to its FIG. 1 position by means (not shown), such as by film winding means which moves the next film exposure frame into position for exposure. In so moving, high energy member 26 moves up and over cam surface 25 on arm 23 of shutter actuator 20.

The invention is particularly suited for use in low priced cameras having a fixed maximum exposure time of, for example, 1/90th second, and, if desired, variable exposure times shorter than this as controlled by the exposure control circuit. The exposure time can be varied by suitable selection of spring tensions and the bimetallic element characteristics, as well as by arranging the exposure control circuit to provide controlled delay time between opening of blade 10 and closing of switch 30.

The invention has been described with reference to a preferred embodiment. However it will be appreciated that variations and modifications can be effected within the ordinary skill of the art without departing from the scope of the invention.

I claim:

1. An electrically operated photographic shutter including a moveable element for blocking and unblocking an exposure aperture comprising:
   bimetallic means which bends in response to heating,
   means connecting said bimetallic means to said moveable means to operate said element, and
   electric circuit means for heating said bimetallic means.

2. A shutter according to claim 1, further comprising:
   heat sink means moveable into heat transferring relation to said bimetallic means to accelerate cooling of said bimetallic means.

3. A shutter according to claim 2, further comprising: means for actuating said circuit means at the beginning of an operating cycle, and terminating said actuation at the end of a cycle, and means for moving said heat sink means into said heat transferring relation at termination of a cycle.

4. An electrically operated shutter for a photographic camera having a shutter actuator and at least one moveable element for blocking and unblocking an exposure aperture in an exposure cycle, comprising:
   bimetallic means which bends in response to heating;
   means operably connecting said bimetallic means to said moveable element to cause light path blocking movement of said moveable element upon bending of said bimetallic means;
   electric circuit means for heating said bimetallic means; and
   means operated by said shutter actuator to cause said circuit means to heat bimetallic means, causing bending thereof.

5. An electrically operated shutter in accordance with claim 4, further comprising:
   heat sink means moveable into heat transferring relation with said bimetallic means upon release of said shutter actuator.

6. A shutter in accordance with claim 4, further comprising:
   heat sink means normally in heat transferring contact with said bimetallic means; and
   means for removing said heat sink means from said heat transferring contact upon actuation of said shutter actuator and for restoring said heat transferring contact upon release of said shutter actuator.

7. A shutter in accordance with claim 6, wherein said means for removing comprises an operative connection from said shutter actuator to said heat sink means.

8. A shutter in accordance with claim 4, wherein said moveable element comprises a pivoted part, said bimetallic means being elongated and fixed at one end, a moveable portion of said bimetallic means being connected to said pivoted part at a location spaced from its pivot, whereby bending of said bimetallic means upon temperature change causes movement of said part about its pivot.

9. A shutter according to claim 4, wherein there are two said moveable elements, one being an opening element which unblocks the exposure aperture upon actuation of said shutter actuator, the second element being a closing element which moves to block the exposure aperture at the end of an exposure cycle, said blocking movement being caused by bending of said bimetallic means when heated, and heat sink means moveable by said shutter actuator away from said bimetallic means at the beginning of an exposure cycle and into cooling contact with said bimetallic means at the end of an exposure cycle.

10. A shutter according to claim 9, wherein said second element is pivoted, said bimetallic means being elongated and fixed at one end, a moveable portion of said bimetallic means being connected to said second element at a location spaced from its pivot, whereby temperature change of said bimetallic element causes movement of said second element about its pivot.

11. A shutter according to claim 10, wherein said bimetallic means is "U" shaped, the two open ends of the "U" being fixed and the closed end being connected to said second element, said bimetallic means having first and second electrical terminals located one on each of the open ends of said "U", said first terminal being grounded, and capacitor means forming part of said electrical circuit means being connected to said second terminal for discharge through said bimetallic means.

12. A shutter according to claim 10, wherein said heat sink is a material of high thermal conductivity.

13. A shutter according to claim 11, wherein said heat sink is of aluminum.

14. A shutter according to claim 11, wherein said heat sink is of brass.

* * * * *